United States Patent [19]
Fukatsu

[11] Patent Number: 5,517,240
[45] Date of Patent: May 14, 1996

[54] IMAGE PICKUP APPARATUS INCLUDING MATRIX COMPUTING PROCESS WHICH USES COEFFICIENTS FROM IMAGE PICK-UP OUTPUT OF SOLID STATE IMAGER TO GENERATE PRIMARY COLOR COMPONENTS

[75] Inventor: Tsutomu Fukatsu, Kanagawa, Japan

[73] Assignee: Canon Kabushiki Kaisha, Tokyo, Japan

[21] Appl. No.: 204,851

[22] Filed: Mar. 2, 1994

[30] Foreign Application Priority Data

Mar. 5, 1993 [JP] Japan .................................. 5-044950

[51] Int. Cl.⁶ .................................................. H04N 9/07
[52] U.S. Cl. ............................ 348/223; 348/266; 348/279
[58] Field of Search ...................................... 348/222, 237, 348/266, 279, 273; H04N 9/04, 9/07

[56] References Cited

U.S. PATENT DOCUMENTS

| | | | |
|---|---|---|---|
| 4,903,122 | 2/1990 | Ozaki et al. ........................... | 348/237 |
| 5,121,193 | 6/1992 | Nishimura et al. .................... | 348/279 |
| 5,170,249 | 12/1992 | Ohtsubo et al. ...................... | 348/266 |
| 5,280,347 | 1/1994 | Shiraishi et al. ..................... | 348/273 |

Primary Examiner—James J. Groody
Assistant Examiner—Cheryl Cohen
Attorney, Agent, or Firm—Robin, Blecker, Daley & Driscoll

[57] ABSTRACT

A color image pickup apparatus using a single-plate type solid-state image sensor is arranged to obtain a signal of an excellent color separation characteristic. An object image is formed on the photoelectric conversion part of the image sensor with color filters of different colors disposed on each of the picture elements of the image sensor. A signal outputted from the solid-state image sensor is converted into a digital signal by an A/D converter. The digital signal is taken in by a signal processing circuit to separate chrominance signals superposed on a luminance signal. At that time, signals for primary color components are formed by carrying out a matrix computing process by using coefficients obtained from the image pickup output of the solid-state image sensor.

10 Claims, 3 Drawing Sheets

FIG.3

|  | m | m+1 |
|---|---|---|
| n | Mg | G |
| n+1 | Cy | Ye |
| n+2 | G | Mg |
| n+3 | Cy | Ye |
| n+4 | Mg | G |

IMAGE PICKUP APPARATUS INCLUDING MATRIX COMPUTING PROCESS WHICH USES COEFFICIENTS FROM IMAGE PICK-UP OUTPUT OF SOLID STATE IMAGER TO GENERATE PRIMARY COLOR COMPONENTS

BACKGROUND OF THE INVENTION

1. Field of the Invention

This invention relates to a single-plate type color image pickup apparatus using a solid-state image sensor such as a CCD or the like.

2. Description of the Related Art

An image pickup apparatus may be of the kind having a single solid-state image sensor arranged to have an image of the object of shooting formed through each of color filters which transmit light of different colors and disposed one after another on each of the picture elements of the solid-state image sensor. Spatially modulated chrominance and luminance signals are formed from a signal outputted from the solid-state image sensor on which the object image is formed.

FIG. 3 shows one example of arrangement of the color filters disposed on the solid-state image sensor. In FIG. 3, reference symbols Mg, G, Cy and Ye respectively denote color filters of colors including magenta, green, cyan and yellow. The solid-state image sensor on which the color filters are arranged in this manner is operated to obtain a color signal from its output as follows.

A video signal is first outputted by scanning an even-number field and an odd-number field. At that time, in the even-number field, electric charges obtained at the picture elements (light receiving elements) of vertically adjoining horizontal lines n and n+1 are added together and the electric charges of picture elements of lines n+2 and n+3 are likewise added together.

Further, in the odd-number field also, electric charges of the picture elements of vertically adjoining horizontal lines n+1 and n+2 are added and the electric charges of the picture element of lines n+3 and n+4 are likewise added together. These added electric charges are transferred at a predetermined timing. As a result, signals having primary color components are outputted in composing ratios as shown in Table 1 below.

TABLE 1

| Field | Line | Col. | Computing Formula | Signal |
|---|---|---|---|---|
| even-number field | n | m | Mg + Cy = R + G + 2B | WB |
| | | m + 1 | G + Ye = R + 2G | GR |
| | n + 1 | m | G + Cy = 2G + B | GB |
| | | m + 1 | Mg + Ye = 2R + G + B | WR |
| odd-number field | n | m | Cy + G = 2G + B | GB |
| | | m + 1 | Ye + Mg = 2R + G + B | WR |
| | n + 1 | m | Cy + Mg = R + G + 2B | WB |
| | | m + 1 | Ye + G = R + 2G | GR |

Next, the four signals WB, WR, GR and GB shown above are multiplied by four predetermined coefficients to extract one of the three primary color components. Then, primary color signals of R (red), G (green) and B (blue) are obtained by the following computing processes:

$$\begin{pmatrix} R \\ G \\ B \end{pmatrix} = \begin{pmatrix} x0, x1, x2, x3 \\ x0, y1, y2, y3 \\ x0, z1, z2, z3 \end{pmatrix} \times \begin{pmatrix} WB \\ WR \\ GR \\ GB \end{pmatrix}$$

Since these four signals are outputted in a time sharing manner by the above-stated scanning method, they are not simultaneously obtained. Therefore, a delay element for delaying by one horizontal line, a delay element for delaying by one picture element and a selection circuit are arranged to always give the signal of the same kind.

In the case of the image pickup apparatus of the above-stated single-plate type, however, a luminance signal component is also separated from the color signal components of the four kinds. As a result, the actual color transmission characteristics of the Mg, Ye, Cy and G color filters become R, G and B transmission characteristics which differ from what is mentioned above. Therefore, there has been a problem in that the R, G and B signals obtained by the color separation process do not have an adequate color separation characteristic.

SUMMARY OF THE INVENTION

This invention is developed for the solution of the above-stated problem. It is, therefore, an object of this invention to provide an image pickup apparatus which is capable of obtaining a color signal of an adequate color separation characteristic.

To attain this object, an image pickup apparatus arranged according to this invention is provided with a single solid-state image sensor having different color filters arranged on each of its picture elements and a color separation circuit which forms signals of primary color components by performing a computing process on a signal outputted from the solid-stated image sensor. The signals of primary color components are formed by using computing coefficients obtained from an image pickup signal outputted from the solid-state image sensor.

In the image pickup apparatus according to this invention, the computing coefficients to be used by the color separation circuit are obtained from the output of the solid-state image sensor, and a color separation matrix is arranged in close proximity to the composition of primary color components of an object of shooting by taking the latter into consideration according to the picked-up data of an object image which is to be separated into primary and complementary colors. The embodiment of this invention, therefore, gives a signal having an excellent color separation characteristic.

The above and other objects and features of this invention will become apparent from the following detailed description of an embodiment thereof taken in connection with the accompanying drawings.

BRIEF DESCRIPTION OF THE DRAWINGS

FIG. 3 shows by way-of example the arrangement of color filters which are used for a single-plate solid-state image sensor.

DETAILED DESCRIPTION OF THE PREFERRED EMBODIMENTS

Figure 1:
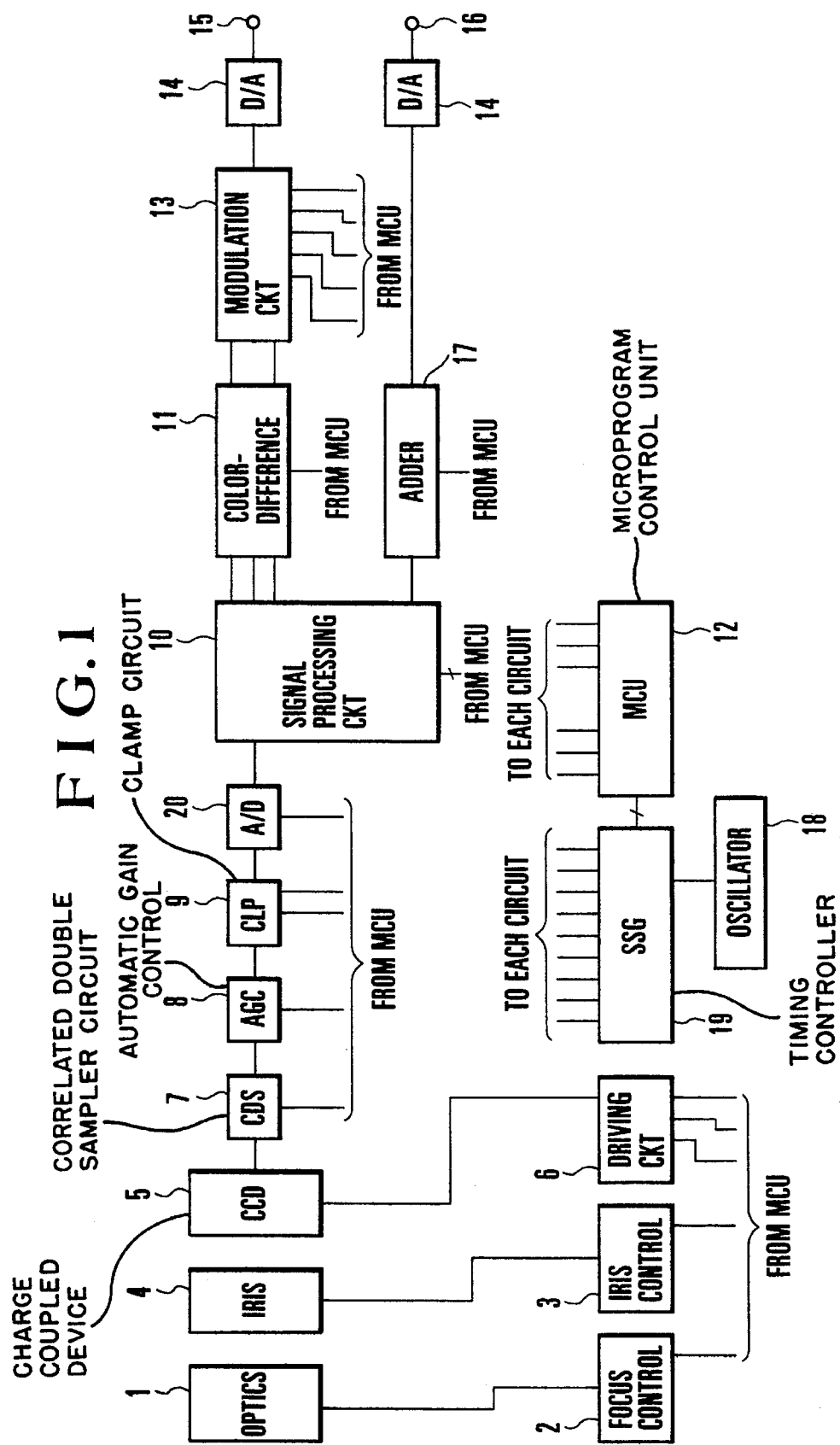
FIG. 1 is a block diagram showing the arrangement of an embodiment of this invention.

FIG. 1 shows in a block diagram the arrangement of a single-plate type solid-state image pickup apparatus arranged as an embodiment of this invention.

The arrangement of the embodiment is described with reference to FIG. 1 as follows. An image pickup optical processing system 1 consists of lenses, etc. A focus control system 2 is arranged to control the focus of the optical processing system 1 (or a photo-taking lens). An iris control system 3 is arranged to control the quantity of incident light by adjusting the aperture of an iris 4.

Figure 3:
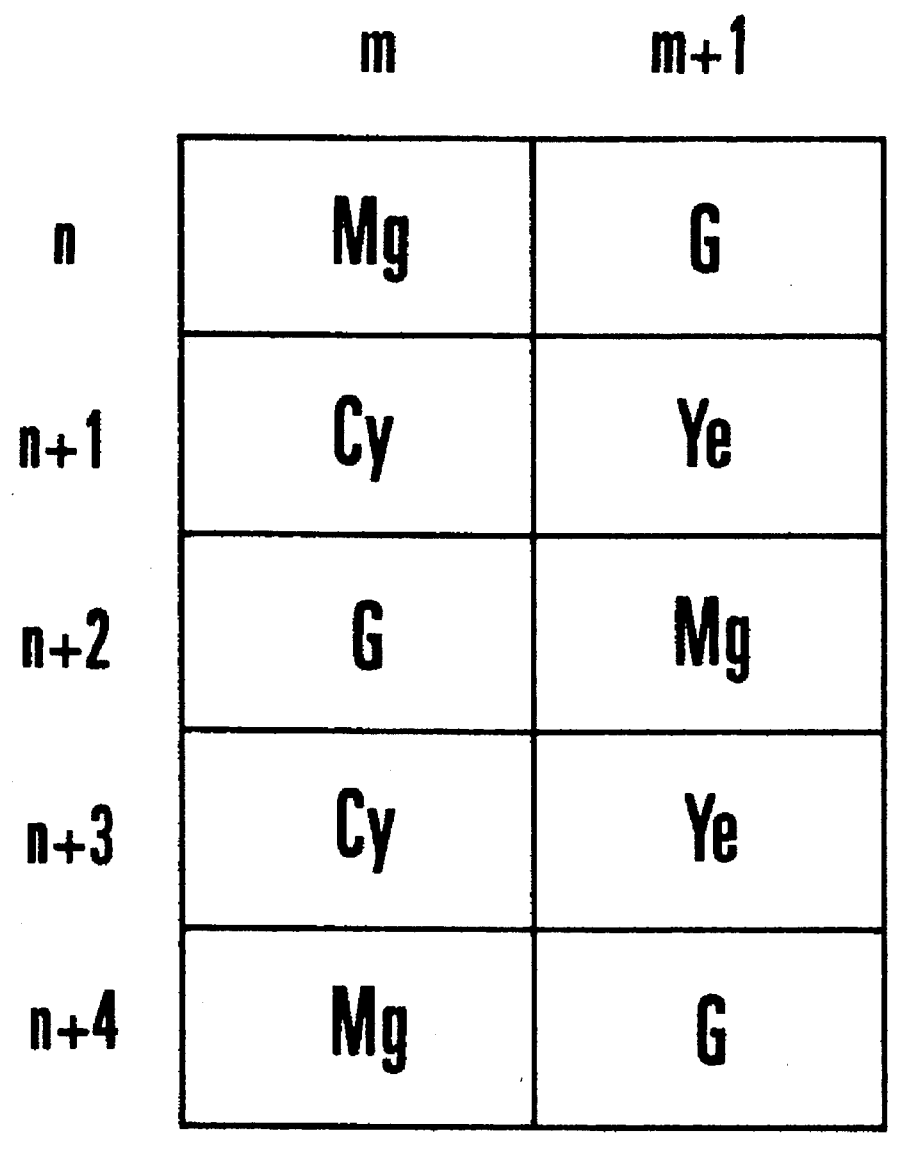

A solid-state image sensor 5 which is a CCD or the like serves as a photo-electric conversion element and is provided with different minute color separation filters, which are arranged as shown in FIG. 3 on the respective picture elements. A driving circuit 6 is arranged to drive the solid-state image sensor 5. The driving circuit 6 outputs a control signal for causing an electric charge accumulated at each of picture elements within the solid-state image sensor 5 to be transferred to a vertical transfer part within a period of time corresponding to the vertical blanking period of a television signal. The driving circuit 6 outputs another control signal for causing the electric charge of a horizontal transfer part coming from the vertical transfer part to be transferred within a period of time corresponding to an effective period of the television signal as a video signal.

A correlated double sampling circuit (CDS) 7 is arranged to perform sampling by removing a reset signal of the signal output of the solid-state image sensor 5 and a clock noise. A gain variable amplifier (AGC) 8 is arranged to vary the gain of the output of the sampling circuit 7 according to a control voltage obtained at its control voltage input terminal. A clamp circuit 9 is arranged to fix the black level of an input video signal at a predetermined voltage. A signal processing circuit 10 performs a signal processing action on a signal outputted from the amplifier 8 for forming a luminance signal and color-difference signals to be included in a television signal. The signal processing circuit 10 includes a color separation circuit which is arranged to form the signals of primary color components.

A color-difference matrix processing part 11 is arranged to form color-difference signals R-Y and B-Y from primary color signals obtained by the signal processing circuit 10. A microprogram control unit (MCU) 12 is arranged to receive digital data relative to signals obtained from the signal processing circuit 10, to form control signals by processing the digital data and to supply the control signals to the signal processing circuit 10, the focus control system 2, the iris control system 3 and the amplifier 8.

A carrier chrominance signal modulation circuit 13 is arranged to form a carrier chrominance signal in conformity to given broadcasting standards from the color-difference signals obtained from the output of the signal processing circuit 10. A D/A converter 14 is arranged to convert a digital signal outputted from the carrier chrominance signal modulation circuit 13 into an analog signal. An output terminal 15 is arranged to output the carrier chrominance signal. An output terminal 16 is arranged to output a luminance signal. Reference numeral 17 denotes an adder. An oscillator 18 is connected to a timing controller (SSG) 19. An A/D converter 20 is arranged to output a digital signal corresponding to an input signal and to receive a timing clock signal from the oscillator 18.

Further, the timing controller (SSG) 19 outputs a horizontal synchronizing signal HD, a vertical synchronizing signal VD, an NTSC/PAL standard change-over signal N/P and clock signals CLOCKS of frequencies and phases required for each processing part, blanking pulses BLK for forming a television signal, burst flag pulses BF, a color subcarrier SC, a line-sequential signal ALT, a dot-sequential signal PALT and a composite synchronizing signal CSYNC and supplies them to applicable parts.

Figure 2:
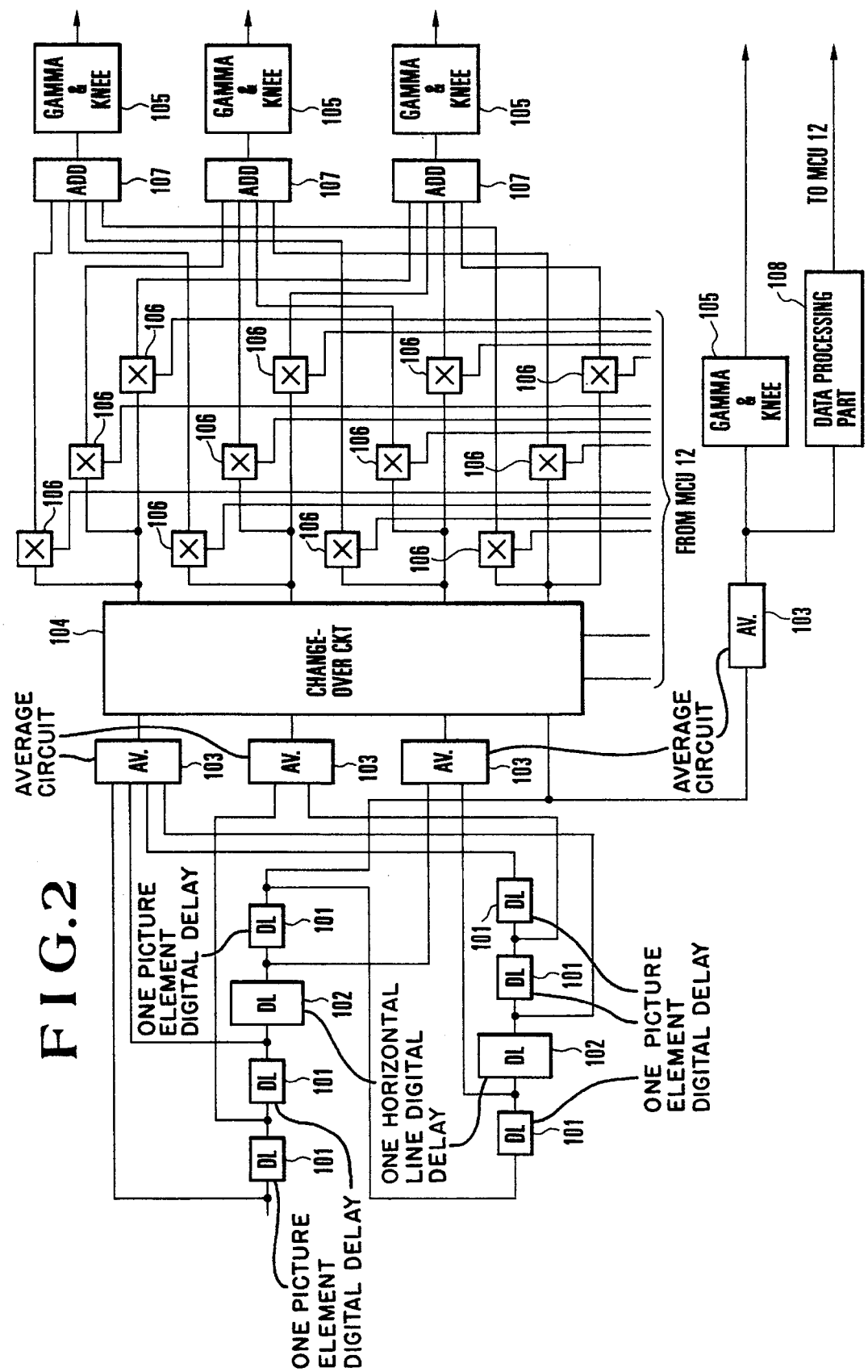
FIG. 2 is a block diagram showing the internal arrangement of a signal processing circuit shown in FIG. 1.

FIG. 2 shows the internal arrangement of the above-stated signal processing circuit 10. This illustration includes digital data delay circuits 101 which are arranged to delay digital data by a fixed length (the horizontal length of one picture element), digital data delay circuits 102 which are arranged to delay digital data by a fixed length (one horizontal line—2 picture elements), averaging circuits 103 which are arranged to obtain addition averages of input digital data, a change-over circuit 104, gamma and knee processing parts 105 which are arranged to perform gamma correction and to compress the level of a high luminance part, multipliers 106, adders 107, and a data processing part 108 which is arranged to perform a preprocessing action to enable the microprogram control unit 12 to easily receive a data signal which is necessary in controlling each of the processing systems mentioned above.

The operation of the embodiment is described as follows. The quantity of incident light of a picked up image from an object of shooting which is not shown is adjusted through the optical processing system 1 and the iris control system 3 and is stored as an electric charge at the light receiving storage part of the solid-state image sensor 5. The electric charge thus stored is transferred to the vertical transfer part within a period of time corresponding to a vertical blanking period of a video signal and is further sent out to the horizontal transfer part during a horizontal blanking period. The electric charge transferred to the horizontal transfer part is outputted from the horizontal transfer part within the effective period of the video signal and is converted into a voltage signal. The sequence of signals which are thus read out and their signal compositions are as shown in Table 2 below.

TABLE 2

| Field | Line | Col. | Computing Formula | Signal |
|---|---|---|---|---|
| even-number field | n | m | Mg' + Cy' = xR + yG + zB | WB |
| | | m + 1 | G' + Ye' = xR + yG + zB | GR |
| | n + 1 | m | G' + Cy' = xR + yG + zB | GB |
| | | m + 1 | Mg' + Ye' = xR + yG + zB | WR |
| odd-number field | n | m | Cy' + G' = xR + yG + zB | GB |
| | | m + 1 | Ye' + Mg' = xR + yG + zB | WR |
| | n + 1 | m | Cy' + Mg' = xR + yG + zB | WB |
| | | m + 1 | Ye' + G' = xR + yG + zB | GR |

A matrix for forming the data of R, G and B signals from the data of the signals of four kinds shown in Table 2 is composed in the following manner. Assuming that object images picked up give demodulation outputs (R, G, B) as (R, G, B)=(X0, X1, 0); (0, Y0, Y1); (Z0, 0, Z1) and that signal data Sig(WB, WR, GR, GB) of four kinds are obtained respectively for these objects as $Sig_x = (WB_x', WR_x', GR_x', GB_x')$ $Sig_y = (WB_y', WR_y', GR_y', GB_y')$ $Sig_z = (WB_z', WR_z', GR_z', GB_z'),$ the color separation matrix $A0 = \alpha ij$ (i=0, 1, 2; j=0, 1, 2, 3) becomes a matrix satisfying the following formulas:

$A0 * Sigx=(X, 0, 0)$ $A0 * Sigy=(0, Y, 0)$ $A0 * Sigz=(0, 0, Z)\ X=Y=Z=1$

This can be solved into the following:

$\alpha i0=(f1-f2\alpha i3)/f0$ $\alpha i1=(e1-e2\alpha i3)/e0$ $\alpha i2=(d1-d2\alpha i3)/d0$ $\alpha i3\ (i=0, 1, 2)$ provided that:

$d0=b0a1-b1a0$ $d1=b0a3-a0b3$ $d2=boa2-b2a0$ $e0=a0$ $e1=a3-a1d1/d0$ $e2=a2-a1d2/d0$ $f0=WBx$ $f1=\{X-WRx\ e1/e0-GRx\ d1/d0\ (i=0)$ $-WRx\ e1/e0-GRx\ d1/d0\ (i=1, 2)$ $f2=GBx-WRx\ e2/e0-GRx\ d2/d0$ Here, the following relations are obtained:

$WBx=(Y0\ Z1\ WBx'-Z1\ X1\ WBy'+X1\ Y1\ WBz')/(X0\ Y0\ Z1+X1\ Y1\ Z0)$ $WBy=(Y1\ Z0\ WBx'+Z1\ X0\ WBy'-X0\ Y1\ WBz')/(X0\ Y0\ Z1+X1\ Y1\ Z0)$ $WBz=(-Y0\ Z1\ WBx'+Z0\ X1\ WBy'+X0\ Y0\ WBz')/(X0\ Y0\ Z1+X1\ Y1\ Z0)$ $WRx=(Y0\ Z1\ WBx'-Z1\ X1\ WBy'+X1\ Y1\ WBz')/(X0\ Y0\ Z1+X1\ Y1\ Z0)$ $WRy=(Y1\ Z0\ WBx'+Z1\ X0\ WBy'-X0\ Y1\ WBz')/(X0\ Y0\ Z1+X1\ Y1\ Z0)$ $WRz=(-Y0\ Z1\ WBx'+Z0\ X1\ WBy'+X0\ Y0\ WBz')/(X0\ Y0\ Z\ 1+X1\ Y1\ Z0)$ $GRx=(Y0\ Z1\ WBx'-Z1\ X1\ WBy'+X1\ Y1\ WBz')/(X0\ Y0\ Z\ 1+X1\ Y1\ Z0)$ $GRy=(Y1\ Z0\ WBx'+Z1\ X0\ WBy'-X0\ Y1\ WBz')/(X0\ Y0\ Z1+X1\ Y1\ Z0)$ $GRz=(-Y0\ Z1\ WBx'+Z0\ X1\ WBy'+X0\ Y0\ WBz')/(X0\ Y0\ Z\ 1+X1\ Y1\ Z0)$ $GBx=(Y0\ Z1\ WBx'-Z1\ X1\ WBy'+X1\ Y1\ WBz')/(X0\ Y0\ Z1+X1\ Y1\ Z0)$ $GBy=(Y1\ Z0\ WBx'+Z1\ X0\ WBy'-X0\ Y1\ WBz')/(X0\ Y0\ Z\ 1+X1\ Y1\ Z0)$ $GBz=(-Y0\ Z1\ WBx'+Z0\ X1\ WBy'+X0\ Y0\ WBz')/(X0\ Y0\ Z\ 1+X1\ Y1\ Z0)$ $a0 = WBy\ WRx = WBx\ WRy \quad a1 = WBy\ GRx = WBx\ GRy$ $a2 = WBy\ GBx = WBx\ GBy \quad a3 = \begin{cases} WBy\ X & (i=0) \\ -WBx\ Y & (i=1) \\ 0 & (i=2) \end{cases}$ $b0 = WBz\ WRx = WBx\ WRz \quad b1 = WBz\ GRx = WBx\ grz$ $b2 = WBz\ GBx = WBx\ GBz \quad b3 = \begin{cases} WBz\ X & (i=0) \\ 0 & (i=1) \\ -WBz\ Z & (i=2) \end{cases}$ Further, in a case where object images which are desired to be $(R, G, B)=(X, 0, 0); (0, Y, 0);$ and $(0, 0, Z)$ are picked up and, for these objects, signal data Sig(WB, WR, GR, GB) of four kinds are obtained as $Sigx=(WBx, WRx, GRx, GBx)$ $Sigy=(WBy, WRy, GRy, GBy)$ $Sigz=(WBz, WRz, GRz, GBz)$ a color separation matrix $A1=\alpha ij\ (i=0, 1, 2; j=0, 1, 2, 3)$ becomes a matrix satisfying the following formulas:

$A1 * Sigx=(X, 0, 0)$ $A1 * Sigy=(0, Y, 0)$ $A1 * Sigz=(0, 0, Z)$

This can be solved into the following:

$\alpha i0=(f1-f2\ \alpha i3)/f0$ $\alpha i1=(e1-e2\ \alpha i3)/e0$ $\alpha i2=(d1-d2\ \alpha i3)/d0$ $\alpha i3\ (i=0, 1, 2)$ provided that:

$d0=b0\ a1-b1\ a0\ d1=b0\ a3-a0\ b3$ $d2=b0\ a2-b2\ a0\ e0=a0$ $e1=a3-a1\ d1/d0\ e2=a2-a1\ d2/d0$ $f0=WBx$ $f1=\{X-WRx\ e1/e0-GRx\ d1/d0\ (i=0)$ $-WRx\ e1/e0-GRx\ d1/d0\ (i=1, 2)$ $P\ f2=GBx-WRx\ e2/e0-GRx\ d2/d0$

Here, the following relations are obtained:

$a0 = WBy\ WRx = WBx\ WRy \quad a1 = WBy\ GRx = WBx\ GRy$ $a2 = WBy\ GBx = WBx\ GBy \quad a3 = \begin{cases} WBy\ X & (i=0) \\ -WBx\ Y & (i=1) \\ 0 & (i=2) \end{cases}$ $b0 = WBz\ WRx = WBx\ WRz \quad b1 = WBz\ GRx = WBx\ GRz$ $b2 = WBz\ GBx = WBx\ GBz \quad b3 = \begin{cases} WBz\ X & (i=0) \\ 0 & (i=1) \\ -WBz\ Z & (i=2) \end{cases}$ From the above-stated two matrixes A0 and A1, a color separation matrix A can be formed as follows:

Using the coefficients of the matrixes A0 and A1 to equalize the R, G and B color separation outputs of the object to be color-separated into a white color, each of columns of each matrix is multiplied by scalers $\beta 0i$ and $\beta 1i$ and coefficients k and (1−k) before addition.

$$A\_=k\ \beta 0i\ \alpha 0ij+(1-k)\ \beta 1i\ \alpha 1ij\ (i=0, 1, 2; j=0, 1, 2, \text{ and } 0 \leq k \leq 1)$$

A so-called white balance process is performed by multiplying each column of the matrix A by the scaler $\beta(i=0, 1, 2)$. This process is performed by using, for example, such coefficients that cause the integrated value of the R, G and B colors of the whole picture of the object to become equal to each other and are variable with the color temperature of a light source illuminating the object, etc. A desired color separation characteristic can be retained even if "$\alpha i3$" is arbitrarily set. Hence, any value that gives desired two-dimensional frequency response which is determined by the dynamic range of the signal and the arrangement of the color filters, etc., can be selected. In deciding the coefficient k, conditions such as differences among individual color filters on the image sensor and hues for which the color separation characteristic is important are taken into consideration.

The operation described above uniformly determines the color separation matrixes $\alpha i * \beta i$.

The signal processing operation of the whole embodiment is described as follows. The video signal for the picked-up image read out from the image sensor 5 by the scanning action described above is supplied to the sampling circuit 7. At the sampling circuit 7, a clock signal component and a reset noise are removed from the video signal. After that, the video signal is amplified by the gain variable amplifier 8 at a gain according to a gain control signal. At the clamp circuit 9, the black level of the video signal is fixed approximately at the standard lower limit of the input range of the A/D converter 20. The video signal is then converted into a digital signal by the A/D converter 20.

The digital signal thus obtained is inputted to the delay circuit arrangement which is composed of the delay circuits 101 for delaying by one picture element and the horizontal line delay circuits 102. The outputs from these delay circuits are inputted to the averaging circuits 103. The outputs of the averaging circuits 103 and the outputs of the delay circuits 101 are inputted to the change-over circuit 104 as indicated in FIG. 2. To the change-over circuit 104 are inputted control signals which include a line-sequential signal ALT and a dot-sequential signal PALT. Under the control of these control signals, the change-over circuit 104 outputs a series of color signal data of the same kind. The outputs of the change-over circuit 104 are inputted to one of the inputs of each of multipliers 106. To the other input of each of the multipliers 106 is inputted an output of the microprogram control unit 12. Each of the multipliers 106 is thus arranged such that the multipliers for the outputs of the change-over circuit 104 can be controlled by the microprogram control unit 12. Further, from the microprogram control unit 12 is outputted the matrix coefficients which are computed by multiplying them by white balance adjusting coefficients in the manner described in the foregoing. Multiplying operations are thus carried out by these multipliers 106 on the signals of different kinds. Adders 107 then add together the results of multiplication of signals of different kinds outputted from the multipliers 106 to give primary color signal components.

Signal data thus outputted are supplied to the gamma and knee processing parts 105 to be subjected to a gamma correction process and a high level data compressing process. The data thus obtained by these processes are supplied to the matrix processing part 11. The matrix processing part 11 forms color-difference signal data from the primary color signal data in accordance with a predetermined ratio.

The data of a reference phase conforming to the given standard of broadcasting is added by the modulation circuit 13 to each of the two color-difference signal data mentioned above in accordance with a color burst flag timing signal BF. By this, two data which have the same amplitudes as that of the above-stated two signal data and are of a sign opposite to that of the signal data are formed. Further, the four data series thus obtained are outputted at a frequency four times as high as the frequency of a subcarrier conforming to the given standard in such a way as to have the data series of the opposite signs at an opposite phases, which correspond to the four phases of the subcarrier. This output is converted into an analog signal by the D/A converter 14. The analog signal thus obtained is inputted to a band-pass filter (not shown) which is arranged to have the subcarrier frequency at its center.

Further, a luminance signal is formed in the following manner. A chrominance signal modulation carrier wave which is determined by the arrangement of color component extracting picture elements of the image sensor 5 is removed by the averaging circuit 103 which serves as a low-pass filter and provides input to gamma and knee unit 105. After that, the luminace signal is formed at a signal forming part which is arranged to perform gamma and knee processes.

As described above, the single-plate type color image pickup apparatus which obtains spatially modulated chrominance and luminace signals from the solid-state image sensor is arranged, according to this invention, such that the computing coefficients to be used by a color separation circuit which obtains primary color components by carrying out a computing process on the signals outputted from the solid-state image sensor for different colors of light are obtained from the image pickup signal outputted from the solid-state image sensor. Therefore, a color signal having a good color separation characteristic can be obtained.

In accordance with this invention, as mentioned above, the computing coefficients to be used for the computing process by the color separation circuit are arranged to be obtained from the signal outputted from the solid-state image sensor. It is, therefore, an advantage of this invention that a signal having a good color separation characteristic can be obtained.

What is claimed is:

1. An image pickup apparatus comprising:
    a single solid-state image sensor having different color filters arranged on respective picture elements; and
    a color separation circuit arranged to form a signal for each of primary color components through a coefficient multiplying computing process on a signal outputted from said solid-state image sensor, the coefficient multiplying computing process of said color separation circuit being performed by using a computing coefficient which is obtained from said image pickup signal outputted from said solid-state image sensor.

2. An image pickup apparatus comprising:
    a) color image pickup means having a plurality of picture elements and having different color filters arranged on the respective picture elements;
    b) matrix computing means for forming a predetermined color signal from an output of said color image pickup means by performing matrix computation; and
    c) coefficient forming means for forming, on the basis of the output of said color image pickup means, coefficients to be used for the matrix computation by said matrix computing means.

3. An apparatus according to claim 2, wherein said color image pickup means includes a CCD.

4. An apparatus according to claim 2, wherein said matrix computing means is arranged to perform digital matrix computing.

5. An image pickup apparatus comprising:

an image sensor having different color filters arranged on respective picture elements thereof; and a color separation circuit arranged to form a signal for each of primary color components by processing an image pickup signal outputted from said solid-state image sensor by using a computing coefficient which is obtained from said image pickup signal outputted from said image sensor.

6. An apparatus according to claim 5, wherein said color separation circuit comprises respective sets of multiplying circuits corresponding to said primary color components and computing means for computing respective different coefficients for each of said multiplying circuits.

7. An apparatus according to claim 6, wherein said color separation circuit further comprises respective adding circuits corresponding in number to said primary color components, each said adding circuit receiving inputs from a distinct set of said multiplying circuits.

8. An apparatus according to claim 7, wherein each set of said multiplying circuits comprises four individual multiplying circuits.

9. An apparatus according to claim 6, wherein said color separation circuit further includes delay circuit means receiving said image pickup signal outputted from said image sensor and averaging circuit means receiving output signals of said delay circuit means.

10. An image pickup apparatus comprising:

an image sensor having different color filters arranged on respective picture elements thereof; and a color separation circuit arranged to form a signal for each of primary color components by processing an image pickup signal outputted from said solid-state image sensor by using a computing coefficient variably adaptive in correspondence with changes in said image pickup signal outputted from said image sensor.

* * * * *

UNITED STATES PATENT AND TRADEMARK OFFICE
CERTIFICATE OF CORRECTION

PATENT NO. : 5,517,240
DATED : May 14, 1996
INVENTOR(S) : Tsutomu Fukatsu

It is certified that error appears in the above-indentified patent and that said Letters Patent is hereby corrected as shown below:

Col. 6, line 51, delete "P".

Col. 6, line 67, change ":" to -- . --.

Col. 7, line 7, before "and" insert -- 3; --.

Col. 7, line 9, change "Aby" to -- A_ by -- and change "Q(i=0" to --Q _(i=0 --.

Col. 7, line 24, change "∠i" to --∠_i -- and change "Qi" to --Q_i --.

Col. 7, line 29, delete "a" (second occurance)

Signed and Sealed this

Seventh Day of January, 1997

Attest:

BRUCE LEHMAN

Attesting Officer         Commissioner of Patents and Trademarks